(12) United States Patent
Mandos et al.

(10) Patent No.: US 7,964,519 B2
(45) Date of Patent: Jun. 21, 2011

(54) COVERING ELEMENT COMPRISING A SOUND ABSORBING ELEMENT

(75) Inventors: Rogier Theodorus Siardus Maria Mandos, Roosendaal (NL); William Fransiscus Maria Beens, Steenbergen (NL); Martijn Jacobus De Koning, Hoogerheide (NL)

(73) Assignee: Polynorm Plastics B.V., Roosendaal (NL)

( * ) Notice: Subject to any disclaimer, the term of this patent is extended or adjusted under 35 U.S.C. 154(b) by 564 days.

(21) Appl. No.: 11/884,218

(22) PCT Filed: Feb. 10, 2006

(86) PCT No.: PCT/NL2006/000070
§ 371 (c)(1),
(2), (4) Date: May 12, 2008

(87) PCT Pub. No.: WO2006/085760
PCT Pub. Date: Aug. 17, 2006

(65) Prior Publication Data
US 2009/0127026 A1    May 21, 2009

(30) Foreign Application Priority Data

Feb. 10, 2005  (NL) .................................... 1028244
Jul. 27, 2005  (NL) .................................... 1029629
Oct. 27, 2005  (NL) .................................... 1030284

(51) Int. Cl.
*B32B 27/04*    (2006.01)
*B32B 27/12*    (2006.01)
*B32B 5/02*     (2006.01)

(52) U.S. Cl. ..................... 442/149; 428/316.6; 181/294; 156/242

(58) Field of Classification Search ............... 428/316.6; 442/149; 181/294; 156/242
See application file for complete search history.

(56) References Cited

U.S. PATENT DOCUMENTS

| | | | | |
|---|---|---|---|---|
| 4,193,474 A | * | 3/1980 | Okubo et al. ................. | 181/287 |
| 4,476,183 A | * | 10/1984 | Holtrop et al. ................ | 442/372 |
| 4,729,917 A | * | 3/1988 | Symdra et al. ................ | 428/190 |
| 4,741,945 A | * | 5/1988 | Brant et al. ................... | 428/158 |
| 4,839,397 A | * | 6/1989 | Lohmar et al. ................ | 521/159 |
| 5,580,646 A | * | 12/1996 | Jansz et al. ................... | 442/391 |
| 5,900,300 A | | 5/1999 | Slaven | |
| RE39,260 E | * | 9/2006 | Byrd et al. .................... | 181/290 |
| 2003/0143385 A1 | * | 7/2003 | Fusseder ...................... | 428/217 |

FOREIGN PATENT DOCUMENTS

| | | |
|---|---|---|
| DE | 3301682 | 7/1984 |
| EP | 0254363 | 1/1988 |

OTHER PUBLICATIONS

PCT Application No. PCT/NL2006/000070, Search Report, Mailed Nov. 5, 2006.

* cited by examiner

*Primary Examiner* — Norca L Torres-Velazquez
(74) *Attorney, Agent, or Firm* — Meyertons, Hood, Kivlin, Kowert & Goetzel, P.C.; Eric B. Meyertons

(57) ABSTRACT

The present invention relates to a covering element comprising a carrier element of fibre-reinforced thermoplastic plastic material, at least one sound-absorbing element extending over at least a part of the surface of the carrier element, and an adhesive layer extending over and beyond at least a part of the surface of the sound-absorbing element, wherein at least a part of the adhesive layer is adhered to the carrier element such that the sound-absorbing element is at least partly enclosed between the adhesive layer and the carrier element, to a method for manufacturing the covering element and the use thereof.

54 Claims, 5 Drawing Sheets

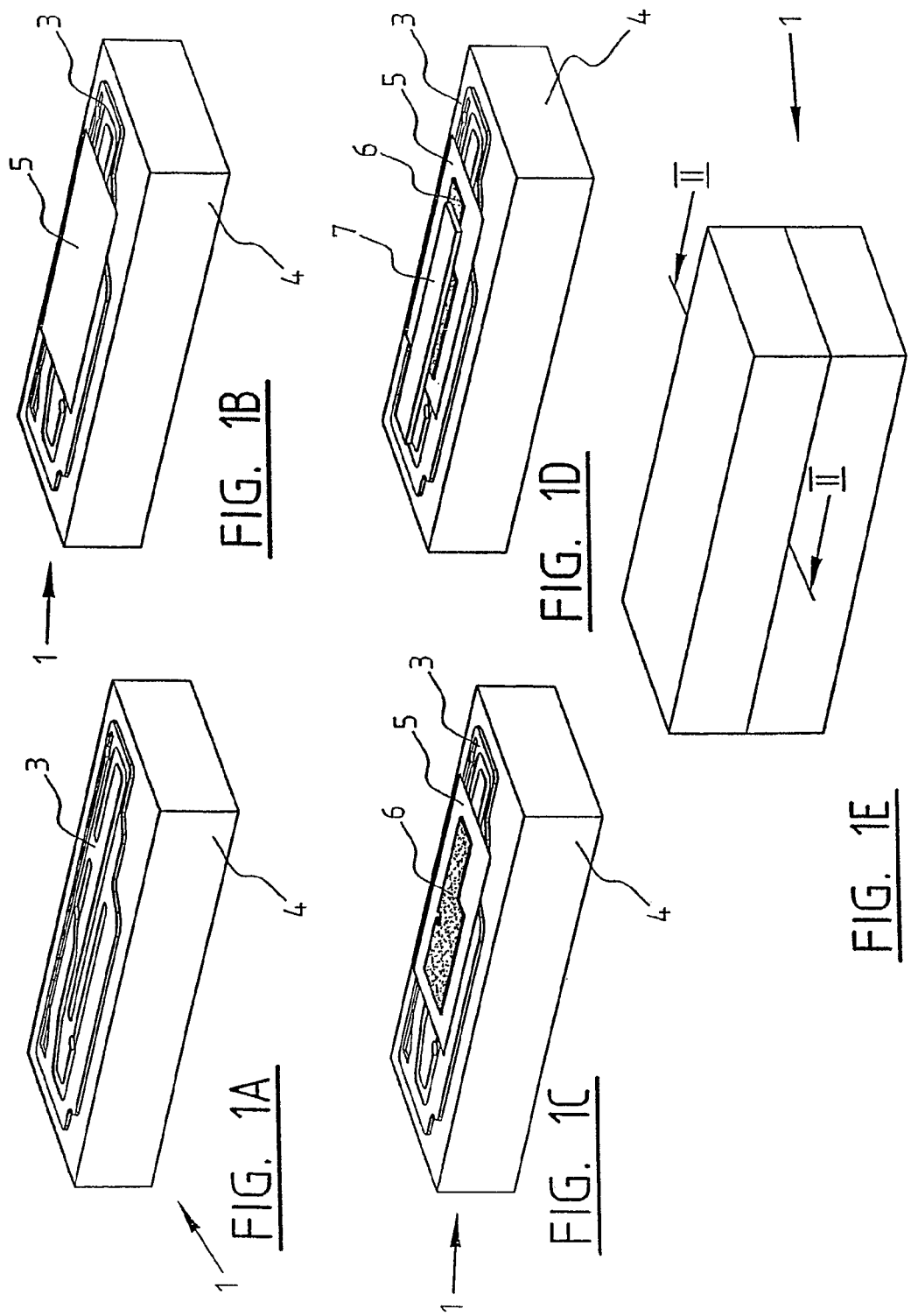

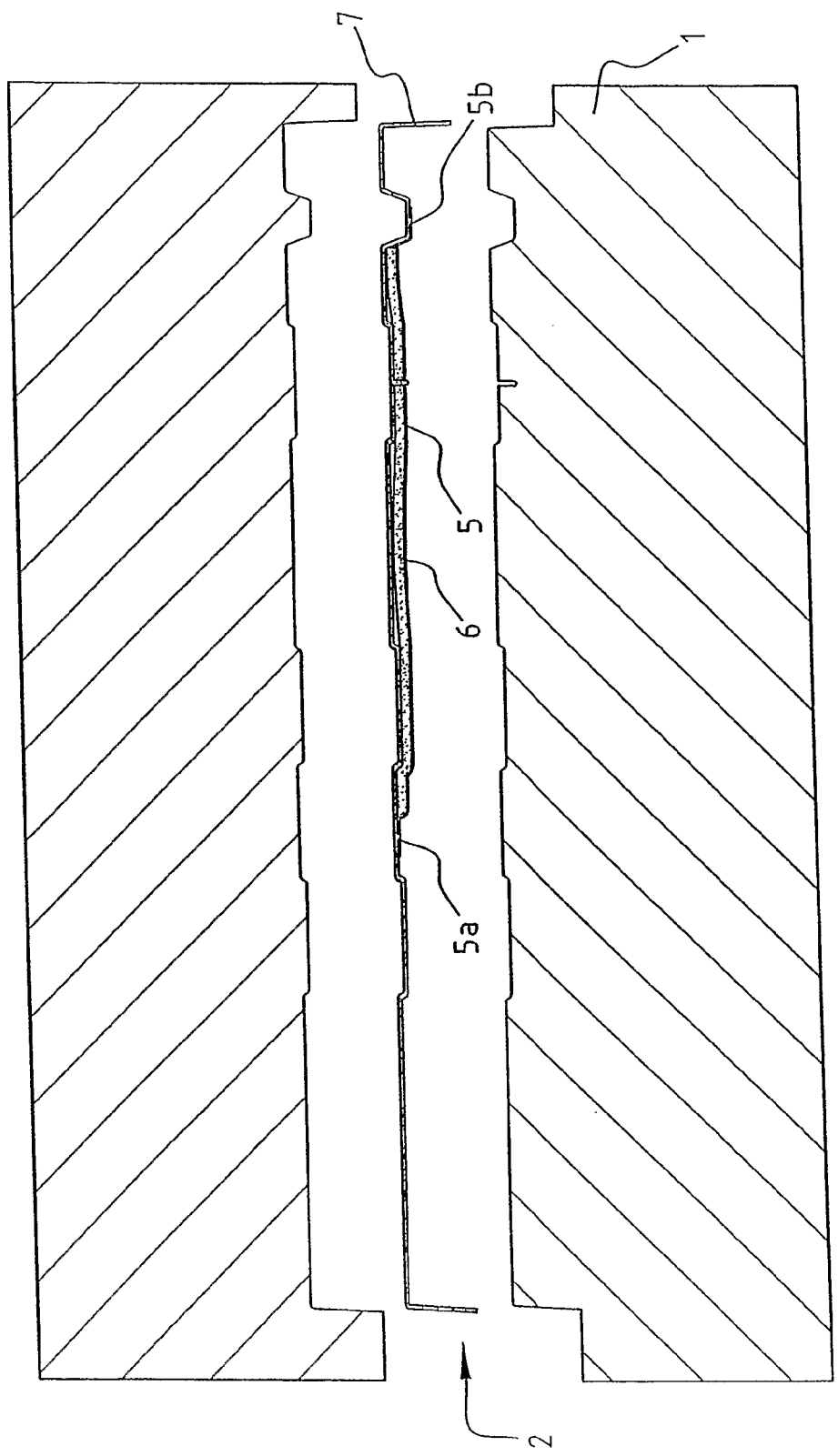

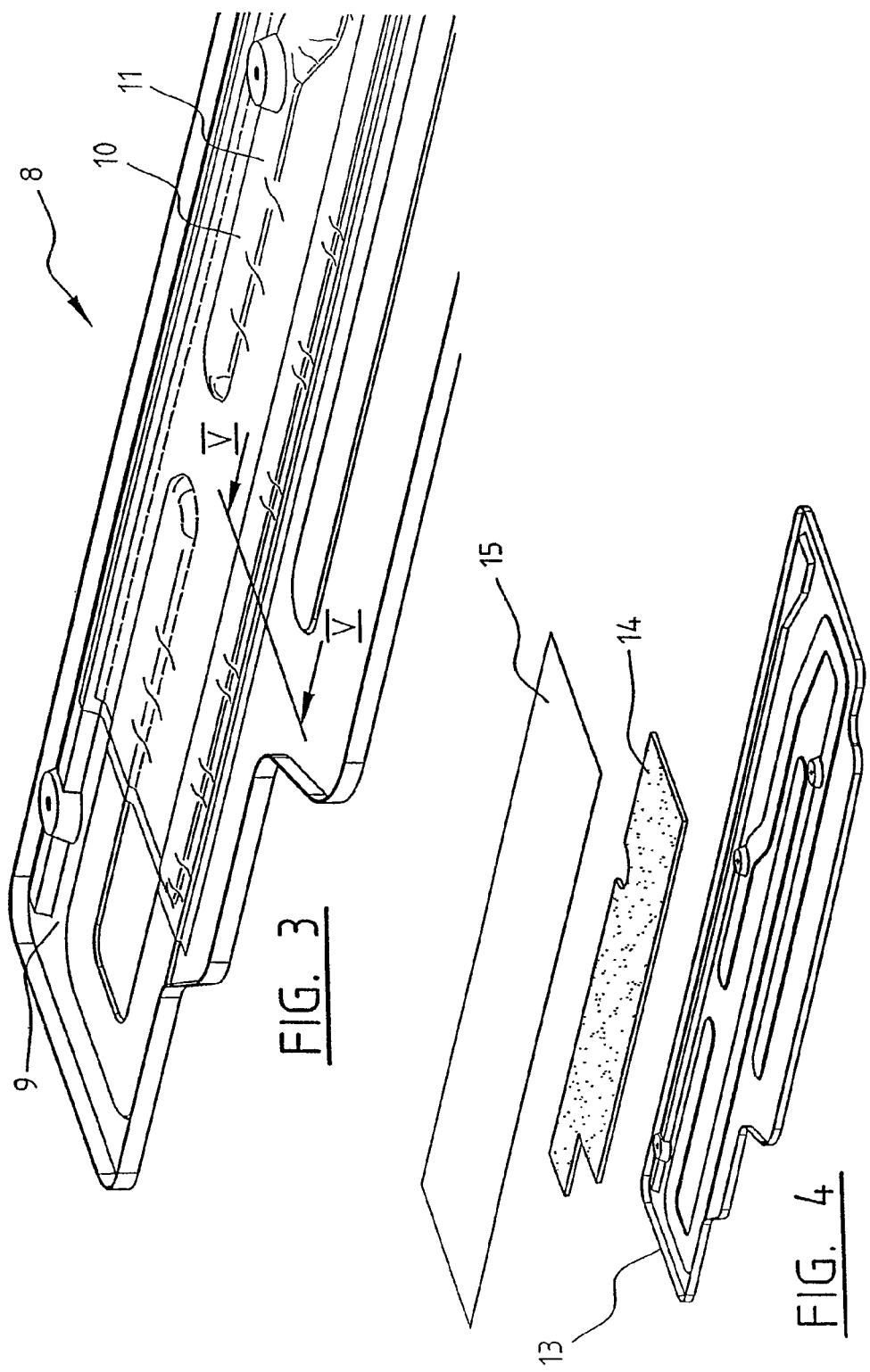

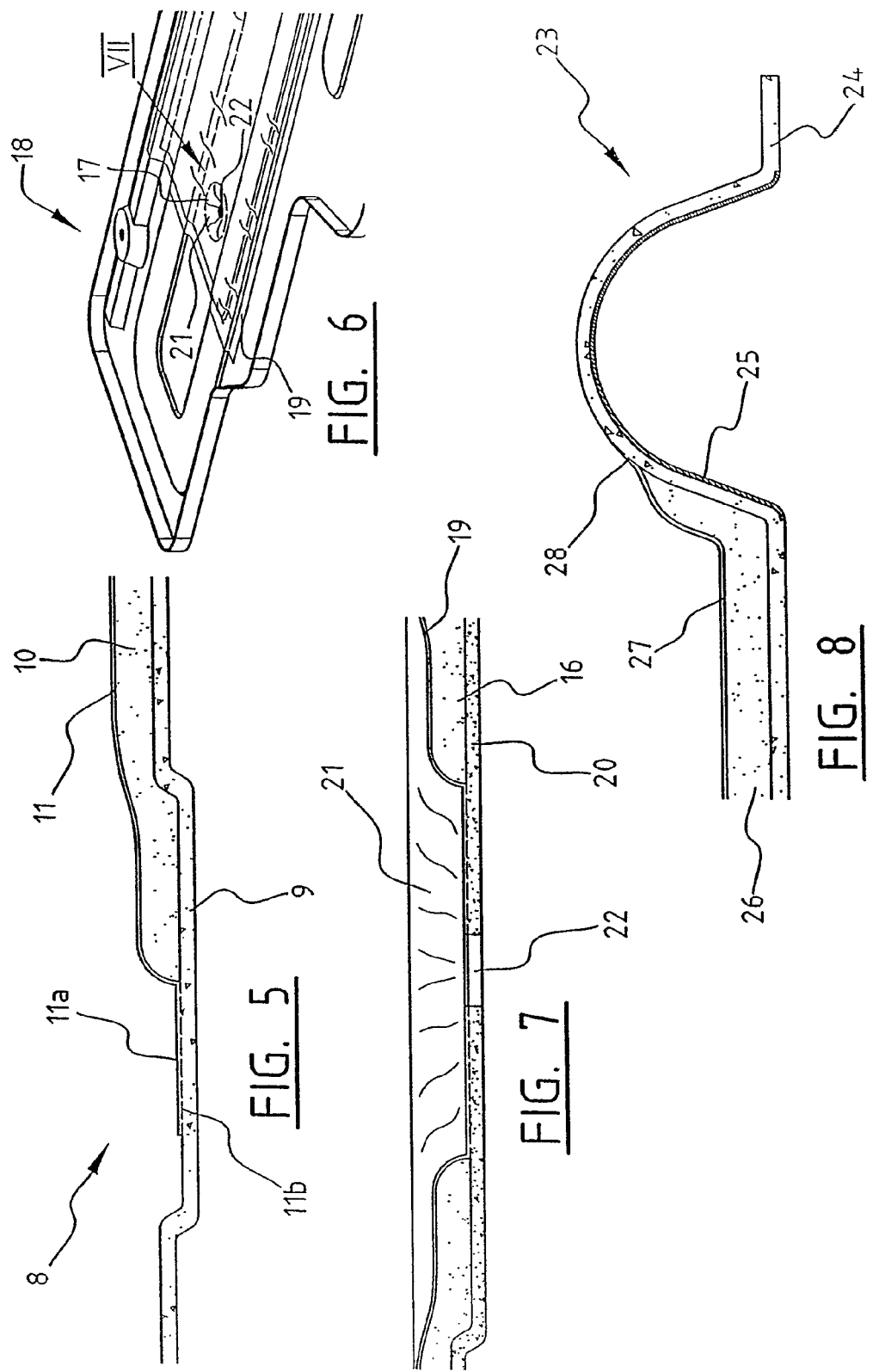

COVERING ELEMENT COMPRISING A SOUND ABSORBING ELEMENT

The present invention relates to a covering element comprising a sound-absorbing element, to a method for manufacturing a covering element, to a covering element obtainable according to this method, to a vehicle covering element comprising said covering element, and the use of the covering element.

In the design and manufacture of vehicles, in particular cars, it is increasingly important that the sounds produced by the vehicle and sounds originating from outside, caused for instance by road chippings against the underside of the car, are absorbed or damped. The decrease in the noise impact of a vehicle has the advantageous effect, among others, that the passenger comfort is improved. In addition, passengers get tired less quickly. Another favourable effect is that the noise impact in the vicinity of the vehicle is reduced.

At the moment however many parts of a vehicle are manufactured from plastic. This is because the use of plastic has a number of advantages over the use of metal. One of the most important properties of the use of plastics is that components can be given a lighter form. Plastic covering elements, i.e. elements which can be used in the manufacture of vehicles, are used in many different places in vehicles, such as for instance in the engine part, as outer surface, but also in the interior of the vehicle.

A drawback of the use of plastic parts on for instance the underside of a car is that, without a sound-absorbing element, they tend to act as a so-called soundbox. The sounds produced by the vehicle are in this case amplified by the plastic parts. This is not desirable. In order to obviate this problem plastic parts can be provided with sound-absorbing elements. The arranging of such elements is however labour-intensive, which results in higher production costs.

The sound-absorbing elements are fixedly connected here to the plastic parts. A drawback hereof is that, when the vehicle is scrapped, or at least disassembled, the sound-absorbing elements are difficult to separate from the plastic parts. Under the terms of the increasingly strict environmental regulations in respect of the scrapping and processing of vehicles, it is however necessary to separate the sound-absorbing elements from the plastic parts. However, because the elements are fixedly connected to the plastic parts, separating the elements from the plastic parts is not possible, or hardly so, and the costs of processing the vehicle become higher.

The present invention has for its object to provide a solution for the above stated problems.

A first aspect of the present invention relates for this purpose to a covering element comprising a carrier element of fibre-reinforced thermoplastic plastic material, at least one sound-absorbing element extending over at least a part of the surface of the carrier element, and an adhesive layer extending over and beyond at least a part of the surface of the sound-absorbing element, wherein at least a part of the adhesive layer is adhered to the carrier element such that the sound-absorbing element is at least partly enclosed between the adhesive layer and the carrier element.

An advantage of such a covering element is that, when the vehicle is scrapped, the sound-absorbing element can be separated easily and integrally from the carrier element. It is after all only necessary to remove or cut open the adhesive layer in order to remove the sound-absorbing element. This has a favourable effect on the environmental impact of the vehicle, as well as on the cost of scrapping or at least disassembling the vehicle.

A further advantage is that the covering element in many cases has better acoustic properties than a covering element in which the sound-absorbing element is adhered to the carrier element. The covering element according to the invention further provides the option in simple manner of using sound-absorbing elements with different sound-absorbing properties, depending on the position at which the covering element is placed in a vehicle. A covering element placed in the vicinity of the engine does after all generally require a greater sound-absorbing capacity than a covering element placed in the vicinity of the wheels.

Another advantage of the covering element according to the invention is that the wall thickness of the covering element is negligibly greater at the positions where no sound-absorbing element is arranged than the wall thickness of a plate without sound-absorbing element.

It is recommended that the sound-absorbing element is enclosed substantially wholly by the adhesive layer and the carrier element. An advantage hereof is that the sound-absorbing element has less chance of moving during use of the vehicle provided with the covering element according to the invention. An additional advantage is that the sound-absorbing element is better protected against outside influences, such as for instance oil products and coolant.

It is further recommended that the adhesive layer is a foil. The advantage of a foil is that it forms a very good barrier against outside substances such as oil products or coolant. Through the use of a foil a relatively good protection is thus obtained from substances which are used in vehicles such as cars and aircraft, and which can act on the sound-absorbing element, whereby the properties of this element deteriorate.

In another recommended embodiment the adhesive layer comprises a fleece. Owing to the relatively open structure thereof, a fleece already has good sound-absorbing properties per se. A very good sound-absorption of the covering element is thus obtained by using fleece in combination with the sound-absorbing element.

It is recommended that a second adhesive layer is arranged on the covering element in addition to the above described adhesive layer, which second adhesive layer is situated between the sound-absorbing element and the carrier element. The advantage of this second adhesive layer is that, when a recess is arranged in the sound-absorbing element, the fibre-reinforced thermoplastic plastic material cannot come to lie under the sound-absorbing element. This avoids that in the case of a number of elements a part of the sound-absorbing element comes to lie on the wrong side of the carrier element during the manufacture of the covering element.

The thermoplastic plastic material preferably comprises a polyolefin. It is however particularly recommended that the plastic material is polyamide, polypropylene or polyethylene. The use of these materials is advantageous because they allow easy forming into a desired shape and because they have very good mechanical properties after forming.

In order to further strengthen the covering element, the thermoplastic plastic material comprises fibres, whereby a composite is formed. The fibre percentage in the thermoplastic plastic material of the carrier element preferably lies in the range of 5 to 80% by weight, preferably 10 to 25% by weight, more preferably about 20% by weight.

The fibres preferably comprise glass fibres and/or basalt fibres and/or natural fibres. When the fibres comprise natural fibres, it is then recommended that they comprise hemp fibres, banana fibres, coconut fibres and/or flax fibres. The use of natural fibres has the advantage that they are environmentally-friendly. An additional advantage is that they are easy to process, relatively low in price and do not leave any residual products (slag) in thermal recycling.

It is further recommended that the sound-absorbing element comprises an open-cell structure. Such a structure generally has a very good sound-absorbing capacity, whereby it is suitable for absorbing vehicle sounds.

The open-cell structure preferably comprises foam material. The foam material is preferably preformed in two-dimensional or three-dimensional manner, and can preferably be removed from a roll. The advantage of foam material is that different thicknesses and different materials can be used. The advantage hereof is that the sound absorption in a determined range can be improved by for instance using a thicker or more compact foam. It is also possible to arrange multiple layers of the same foam on top of each other. It is also possible to combine different types of foam with each other, such that a desired degree of sound absorption or damping is obtained. It is further recommended that the foam material comprises polyurethane.

The sound-absorbing element can also be manufactured from a felt-like material, glass wool or rock wool. It is herein noted that a combination with for instance foam material as described above is also possible here.

In a recommended embodiment the sound-absorbing element comprises a plurality of separate parts with differing sound-absorbing properties. The parts can for instance be stacked on top of each other here so that an element is obtained with a desired degree of sound absorption. It is thus possible to adjust the sound-absorbing properties subject to the position at which the covering element is placed. This makes the covering element very widely applicable.

The sound-absorbing element can be provided with openings whereby the adhesive layer is adhered to the carrier element during the manufacture of the covering element. This ensures that the sound-absorbing element remains properly positioned at the same position during its lifespan, and that the chance of it shifting during use is reduced. The use of such openings in the sound-absorbing element is particularly advantageous when the sound-absorbing element comprises a relatively large surface area. It is further also possible for smaller openings to be arranged during manufacture in the area where the adhesive layer is adhered to the carrier element, i.e. the openings are arranged in the adhesive layer and the carrier element. Such smaller openings can be used to discharge water which could get onto the covering element during use of the covering element in a vehicle.

It is recommended that the adhesive layer comprises a thermoplastic plastic material, preferably polypropylene. It is however further recommended that the adhesive layer comprises substantially the same thermoplastic material as the thermoplastic plastic material of the carrier element. It is here also recommended that this is polypropylene.

In a recommended embodiment the adhesive layer is impregnated with a water-repellent, oil product-repellent and/or fuel-repellent agent. Such an impregnation is advantageous since many of the oil products, such as lubricating oil, hydraulic oil, brake fluid, engine oil and other substances such as cooling agents, hydraulic liquids and fuels, used in the vehicle industry, such as the car and aircraft industry, can affect the quality of the adhesive layer or even penetrate the sound-absorbing element. This has an adverse effect on the lifespan of the covering element, as well as on the sound-absorbing properties of the element.

In an embodiment of the invention a thermostable element is arranged between the carrier element and the sound-absorbing element and/or between the adhesive layer and the sound-absorbing element. The thermostable element ensures that the sound-absorbing element does not adhere to the carrier element and/or the adhesive layer during the manufacture of the covering element. The thermostable elements find particular application with sound-absorbing elements which are not thermostable, or hardly so, i.e. they for instance melt, decompose or otherwise lose their three-dimensional structure under the influence of heat. The thermostable layer can further be chosen such that it makes an additional contribution toward absorption of sound. The use of such a thermostable layer is however not essential to the invention.

It is recommended that the thermostable element is integrated with the sound-absorbing element. This makes manufacture of the covering element simpler and the elements are prevented from shifting relative to each other during use. A foam material is preferably used on which the thermostable element is arranged as a covering.

In a preferred embodiment a part of the covering element is provided with a heat-resistant element, preferably an aluminium element. The heat-resistant element can herein be arranged on only one side of the covering element but also on both sides, i.e. on both the carrier element and the adhesive layer. The heat-resistant element is preferably arranged at a position on the covering element where no sound-absorbing element is arranged. In some circumstances it may however be desirable to also place the heat-resistant element at locations on the covering element where a sound-absorbing element is positioned.

In an embodiment of the present invention the covering element is substantially flat. Such flat elements are generally applied in the automobile industry as protective plate for the engine and/or the underside of the car. The elements can however also be used on the inside of the car. Such elements can further also be used in the aviation industry in particular.

It is recommended that the fibre-reinforced thermoplastic plastic material of the carrier element comprises a glass mat-reinforced thermoplastic (GMT) or a long fibre-reinforced thermoplastic (LFT). These composite materials are mostly used in the automobile industry, wherein the plastic material usually comprises polypropylene.

A second aspect of the present invention relates to a method for manufacturing a covering element comprising of:

i) arranging in a mould a carrier element of fibre-reinforced thermoplastic plastic material at increased temperature, a sound-absorbing element and an adhesive layer, such that the adhesive layer extends over at least a part of the surface of the sound-absorbing element;

ii) bringing the carrier element, the sound-absorbing element and the adhesive layer into the desired shape in the mould at increased pressure for the purpose of forming a covering element, wherein the fibre-reinforced thermoplastic plastic material of the covering element is in a viscous phase such that the plastic material spreads over the sound-absorbing element and over a part of the adhesive layer;

iii) cooling the covering element in the mould such that the fibre-reinforced thermoplastic plastic material forms a solid carrier element which is adhered to a part of the adhesive layer and wherein the sound-absorbing element is at least partly enclosed between the carrier element and the adhesive layer.

Because the thermoplastic material of the carrier element is viscous during the manufacture as a result of its relatively high temperature, the adhesive layer fuses to the carrier element. The adhesive layer does not melt at the locations where the sound-absorbing element is arranged, and no connection is thus obtained between the adhesive layer and the carrier element. In this way a covering element can be obtained by means of a single processing step which has a desired shape and which is simultaneously provided with a sound-absorbing element. This has a very favourable effect on the production costs of the covering element. An additional advantage is that the method can be performed continuously or semi-continuously. This also has a favourable effect on the production cost of the sound-absorbing element. Since there is often little space for sound-absorbing elements, the simple thickness structure (by placing multiple layers on top of each other) is advantageous.

Step i) preferably comprises of heating the carrier element to a temperature of at least 175 to 275 degrees Celsius; preferably between 200 and 220 degrees Celsius, and arranging the heated carrier element in the mould. This heating of the carrier element preferably takes place in an infrared oven. It is however also possible to heat the carrier element when it lies in the mould such that it becomes viscous, although heating the carrier element first before placing it in the mould is recommended. The advantage of heating the carrier element is that the plastic material spreads relatively easily through the mould during pressing so that the carrier element is brought homogeneously into the desired shape. An additional advantage is that the pressing force does not have to be so great, which has a favourable effect on production costs. When polypropylene is used as plastic, the material is preferably heated to about 220° C., whereafter the element is placed in the mould.

It is recommended that the temperature of the mould is lower than the temperature of the heated carrier element. It is recommended that the temperature of the mould lies between 25° C. and 70° C., more preferably is about 60° C. The temperature of the adhesive layer and the sound-absorbing element further preferably lies between 10 and 100° C., most preferably about 25° C.

In an embodiment of the present invention the adhesive layer extends over the whole surface of the sound-absorbing element in step i) such that the sound-absorbing element is enclosed in its entirety between the carrier element and the adhesive layer when step ii) is performed. An advantage hereof is that the sound-absorbing element provided with the covering element cannot be displaced during use of the vehicle. An additional advantage is that the sound-absorbing element is protected from outside influences such as for instance water, oil products, fuel and coolant.

It is recommended to first place the adhesive layer in the mould, and then the sound-absorbing element and the thermoplastic material. The reverse sequence is however also possible. The thermoplastic plastic material is here introduced into the mould first, and then the sound-absorbing element and the adhesive layer. It is particularly recommended to combine the sound-absorbing element and the adhesive layer into a total package outside the mould, and to place this package as a whole in the mould.

It is further recommended that a second adhesive layer is arranged on the covering element in addition to the above described adhesive layer, this second adhesive layer being arranged between the sound-absorbing element and the carrier element. The advantage of this second adhesive layer is that, when a recess is arranged in the sound-absorbing element, the fibre-reinforced thermoplastic plastic material is not pressed under the sound-absorbing element during the manufacture of the covering element. This avoids that in the case of a few plates a part of the sound-absorbing element comes to lie on the wrong side of the carrier element during manufacture.

It is recommended here, prior to performing step i), to form a package of the first adhesive layer and the second adhesive layer with the sound-absorbing element therebetween. This package can then be placed in the mould and brought into contact with the fibre-reinforced plastic material. This forming of a package can for instance be achieved by fusing a part of the adhesive layers to each other.

In a preferred embodiment the sound-absorbing element is provided with openings. During pressing the adhesive layer comes into contact with the carrier element in the vicinity of these openings. Because the carrier element is relatively warm, the adhesive layer melts onto the carrier element and a good permanent connection is obtained. This ensures that the sound-absorbing element remains in the same position during its lifespan. The use of such openings in the sound-absorbing element is particularly advantageous when relatively large surface areas of sound-absorbing element are used. It is further also possible for smaller openings to be arranged during manufacture in the area where the adhesive layer is adhered to the carrier element. Such smaller openings can be used to drain water which could come to lie on the covering element during use of the covering element in a vehicle.

A third aspect of the present invention relates to a covering element obtainable using the above described method.

A fourth aspect of the present invention relates to a vehicle covering element comprising a covering element as described above.

A final aspect of the present invention relates to the use of a covering element according to the invention for covering a vehicle, preferably a car or an aircraft.

Mentioned and other features of the covering element and the method for manufacturing the covering element according to the invention will be further elucidated hereinbelow on the basis of a number of exemplary embodiments, which are only given by way of example and without the invention being deemed limited thereby. Reference is made herein to the accompanying drawings, in which:

FIG. 1 shows a view of an embodiment of a method for manufacturing an embodiment of a covering element according to the invention;

FIG. 2 shows a view of the mould of FIG. 1 for manufacturing an embodiment of a covering element, in addition to an embodiment of a covering element according to the invention;

FIG. 3 shows a view of an embodiment of a covering element according to the invention;

FIG. 4 shows a view with exploded parts of an embodiment of a covering element according to the invention;

FIG. 5 is a side view of a covering element according to an embodiment of the invention;

FIG. 6 is a view of a covering element according to an embodiment of the invention;

FIG. 7 shows in detail a drainage part of an embodiment of a covering element according to the invention;

FIG. 8 is a side view of a covering element provided with a heat-resistant element;

Figure 9:
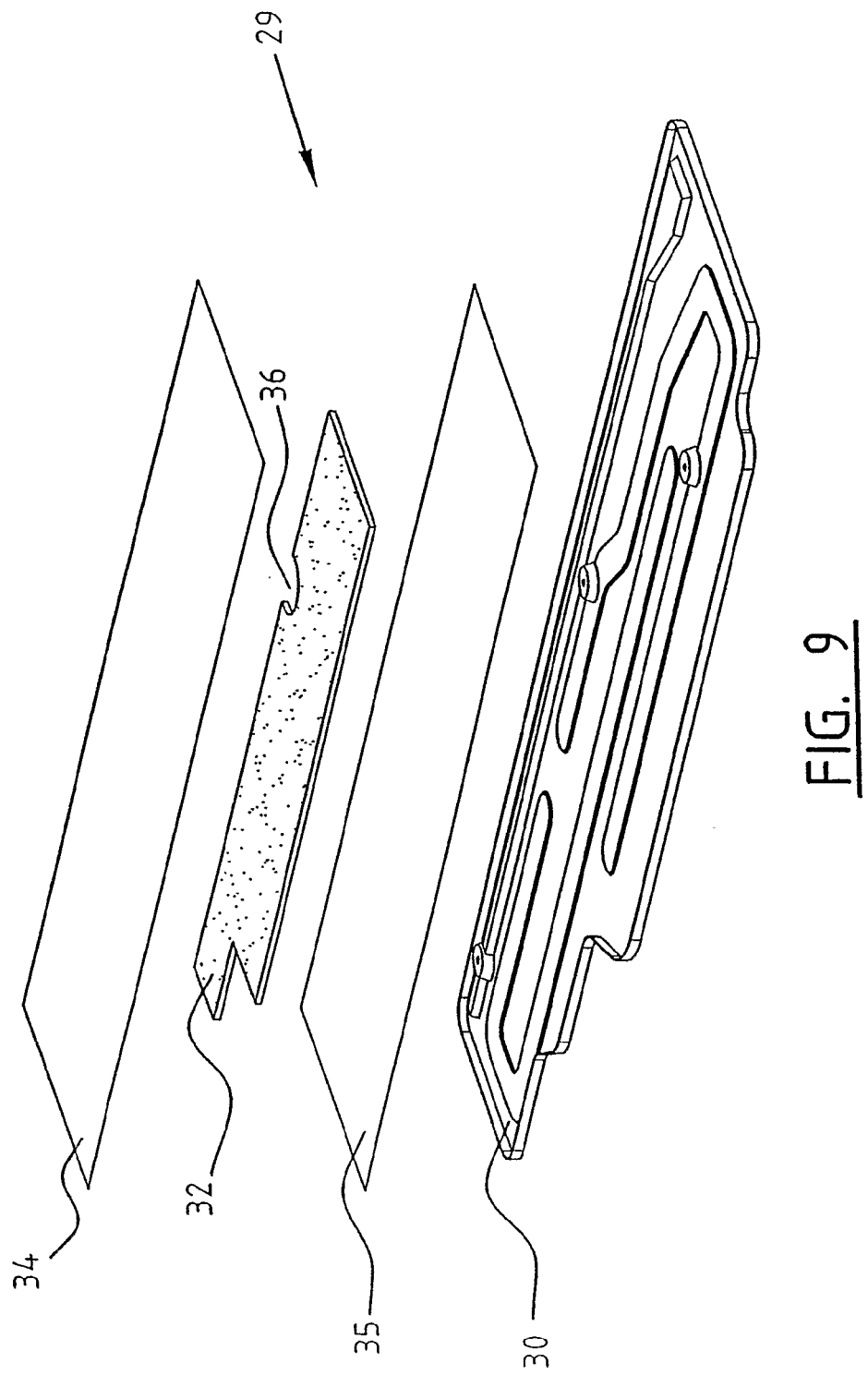
FIG. 9 shows a view with exploded parts of an embodiment of a covering element according to the invention.

FIG. 1A shows a part of a mould 1 for manufacturing a covering element 2. Mould part 1 comprises a forming part 3 for forming covering element 2 and a metal core 4. FIG. 1B shows the application of an adhesive layer 5 of a thermoplastic material, preferably polypropylene, to forming part 3 of mould part 1. A sound-absorbing element 6 is arranged on this adhesive layer 5, FIG. 1C. Sound-absorbing element 6 preferably comprises a polyurethane foam structure. Depending on the position of the covering element on the vehicle, preferably a car, the foam layer is thinner or thicker, or more compact, or consists of layers of a different sound-absorbing material. A carrier element 7 is then arranged on sound-absorbing element 6 and on adhesive layer 5, FIG. 1D. Carrier element 7 herein comprises fibre-reinforced thermoplastic material, wherein it is particularly recommended that the carrier element comprises a composite material of polypropylene and glass fibres, so-called LFT or GMT. Before being placed in the mould, carrier element 7 is heated to about 220° C. in an infrared oven. Due to the heating the thermoplastic material becomes soft and spreads under pressure, whereby it can be pressed relatively easily into a desired shape. It is noted here that it is not necessary for pressing purposes that carrier element 7 extends completely over sound-absorbing element 6 and adhesive layer 5. This is because during pressing of the soft carrier element 7 the thermoplastic material will be fully spread. FIG. 1E shows mould 1 in closed situation, wherein covering element 2 is pressed into the desired shape. During this pressing the thermoplastic plastic material of carrier element 7 spreads over adhesive layer 5 and over sound-absorbing element 6. At the locations where the soft and relatively warm thermoplastic material of carrier element 7 contacts adhesive layer 5, this latter will fuse to carrier element 7, at the positions where the sound-absorbing element is situated this does not occur. Nor does the sound-absorbing element fuse to the carrier element and/or the adhesive layer. Because adhesive layer 5 extends over sound-absorbing element 6, during pressing the sound-absorbing element 6 will be enclosed between adhesive layer 5 and carrier element 7 without sound-absorbing element 6 being connected to the carrier element. During pressing the sound-absorbing element 6 is compressed, but almost completely regains its former shape after the pressing. The structural properties of carrier element 7 are further not affected, or hardly so, by the arranged sound-absorbing element 6. A covering element 2 suitable for vehicles is thus obtained.

FIG. 2 shows mould 1 of FIG. 1 in cross-section, wherein a covering element 2 is formed. Covering element 2 comprises carrier element 7 to which adhesive layer 5 is attached by means of fusing 5a, 5b. Sound-absorbing element 6 is herein enclosed between adhesive layer 5 and carrier element 7 such that it can no longer shift during use of covering element 2 in a vehicle.

FIG. 3 shows a covering element 8 according to an embodiment of the invention. The covering element is designed such that it can serve as a bottom plate of a car. Covering element 8 comprises a carrier element 9. This carrier element 9 comprises a fibre-reinforced thermoplastic plastic material, preferably polypropylene reinforced with glass fibre such as GMT or LFT. Arranged on a part of carrier element 9 is a sound-absorbing element 10 (not shown) over which an adhesive layer 11 is arranged. Adhesive layer 11 herein extends beyond sound-absorbing element 10 so that at least a portion of adhesive layer 11 contacts carrier element 9. At the locations where adhesive layer 11 contacts the carrier element, both 9, 11 are fused to each other. The adhesive layer used is preferably of the same material as the plastic material of carrier element 9, such as polypropylene. The advantage hereof is that a good fusing and a good adhesion takes place between carrier element 9 and adhesive layer 11. Adhesive layer 11 fits very closely over sound-absorbing element 10. This prevents the sound-absorbing element being able to shift during use, and desired shapes can be precisely defined.

FIG. 4 shows a covering element 12 according to an embodiment of the present invention with exploded parts. Covering element 12 comprises a carrier element 13 provided with a desired shape. Covering element 12 further comprises a sound-absorbing element 14 of for instance polyurethane foam. An adhesive layer 15 is further also shown. This adhesive layer 15 extends beyond the surface of sound-absorbing element 14. At the locations where adhesive layer 15 contacts carrier element 13 they are fused to each other such that sound-absorbing element 14 is enclosed therebetween. The adhesive layer and sound-absorbing element 14 herein substantially follow the shape of carrier element 13.

FIG. 5 shows a cross-section of covering element 8 of FIG. 3. Covering element 8 comprises carrier element 9 on which sound-absorbing element 10 is arranged. This sound-absorbing element 10 is held in place by means of the adhesive layer 11 applied thereover. At least a portion 11a of this adhesive layer 11 extends beyond the sound-absorbing element. During the manufacture of covering element 8 this portion 11a has come into contact with carrier element 9 (which was soft during manufacture because of the relatively high temperature thereof) and has been fused to the carrier element, 11b, such that sound-absorbing element 10 is enclosed between carrier element 9 and adhesive layer 11.

FIGS. 6 and 7 show an embodiment of the present invention wherein sound-absorbing element 16 is provided with an opening 17. Because this opening 17 is present in sound-absorbing element 16, adhesive layer 19 is adhered to carrier element 20 in this opening 17 during manufacture of covering element 18, thus defining a dish 21. The advantage of such a dish 21 is that sound-absorbing element 16 cannot shift during use of covering element 18 in a vehicle such as a car. Another advantage is that in an embodiment an opening 22 can be arranged in dish 21 through adhesive layer 19 and carrier element 20, so that dish 21 can be used to drain liquids such as for instance water.

FIG. 8 shows a covering element 23 according to an embodiment of the present invention. Covering element 23 comprises a carrier element 24 on which a sound-absorbing element 26 is arranged. An adhesive layer 27 is applied over this sound-absorbing element 26. This adhesive layer 27 is fused to carrier element 24 at a portion 28 extending beyond sound-absorbing element 26. A part of carrier element 24 is further provided with a heat-resistant element 25. This heat-resistant element 25 ensures that covering element 23 can be applied in the vicinity of a heat source, such as for instance an exhaust system (not shown), without carrier element 24, sound-absorbing element 26 or adhesive layer 27 disintegrating, or at least melting or becoming soft. It is however also possible to provide adhesive layer 27 and/or carrier element 24 with a heat-resistant element 25, such as for instance an aluminium plate. Heat-resistant element 25 can here also extend over the area where a sound-absorbing element is arranged.

FIG. 9 shows a covering element 29 according to an embodiment of the present invention in exploded parts. Covering element 29 comprises a carrier element 30 provided with a desired shape. Covering element 29 further comprises a sound-absorbing element 32 of for instance polyurethane foam. Two adhesive layers 34, 35 are further shown. The first adhesive layer 34 extends beyond the surface of sound-absorbing element 14. At the locations where adhesive layer 34 contacts carrier element 30 they are fused to each other (or to the second adhesive layer 35) such that sound-absorbing element 32 is enclosed therebetween. Adhesive layer 34 and sound-absorbing element 32 herein substantially follow the form of carrier element 30. The second adhesive layer 35 is situated between sound-absorbing element 32 and carrier element 30. Making use of this second adhesive layer 35 prevents the fibre-reinforced thermoplastic plastic material of carrier element 30 coming to lie on the top side of the sound-absorbing element at the position of recess 36 during manufacture of covering element 29. At the locations where the second adhesive layer 35 does not contact the sound-absorbing element it is fused to carrier element 30. Sound-absorbing element 32 can optionally be provided with a thermostable layer such that element 32 does not adhere to the second adhesive layer 35. It is further also possible to adhere the first adhesive layer 34 to the second adhesive layer 35 beforehand, such that a package is formed in which the sound-absorbing element is enclosed. And to place the package in the mould and partly adhere the package to the carrier element during manufacture.

The present invention is not limited to the above described embodiments, the rights sought rather being defined by the following claims, within the scope of which many possible modifications can be envisaged, such as among others a combination of the above described embodiments.

The invention claimed is:

1. Covering element, comprising:
   a carrier element of fiber-reinforced thermoplastic plastic material,
   at least one sound-absorbing element extending over at least a part of the surface of the carrier element, and
   an adhesive layer extending over and beyond at least a part of the surface of the sound-absorbing element, wherein at least a part of the adhesive layer is adhered to the carrier element such that the sound-absorbing element is at least partly enclosed between the adhesive layer and the carrier element and wherein the covering element is at least partially moulded,
   wherein the adhesive layer is separable from the carrier element to allow removal of the sound absorbing element from between the carrier element and the adhesive layer.

2. Covering element as claimed in claim 1, wherein the sound-absorbing element is enclosed substantially wholly by the adhesive layer and the carrier element.

3. Covering element as claimed in claim 1, wherein the adhesive layer is a foil or a fleece.

4. Covering element as claimed in claim 1, wherein a second adhesive layer is arranged between the sound-absorbing element and the carrier element.

5. Covering element as claimed in claim 1, wherein the thermoplastic plastic material is a polyolefin.

6. Covering element as claimed in claim 1, wherein the fiber-reinforced thermoplastic plastic material of the carrier element has a fiber percentage in the range of 5 to 80% by weight.

7. Covering element as claimed in claim 1, wherein the fibers of the carrier element comprise glass fibers and/or basalt fibers and/or natural fibers.

8. Covering element as claimed in claim 7, wherein the natural fibers comprise hemp fibers, banana fibers, coconut fibers and/or flax fibers.

9. Covering element as claimed in claim 1, wherein the sound-absorbing element comprises an open-cell structure.

10. Covering element as claimed in claim 9, wherein the open-cell structure comprises a foam material.

11. Covering element as claimed in claim 1, wherein the sound-absorbing element comprises felt-like material, glass wool or rock wool.

12. Covering element as claimed in claim 1, wherein the sound-absorbing element comprises separate parts with differing sound-absorbing properties.

13. Covering element as claimed in claim 1, wherein the sound-absorbing element is provided with openings such that the adhesive layer is adhered to the carrier element via the openings.

14. Covering element as claimed in claim 1, wherein the adhesive layer comprises the same thermoplastic material as the thermoplastic plastic material of the carrier element.

15. Covering element as claimed in claim 1, wherein the adhesive layer is impregnated with an oil-repellent and/or fuel-repellent agent.

16. Covering element as claimed in claim 1, wherein a thermo stable element is arranged between the carrier element and the sound-absorbing element and/or between the adhesive layer and the sound-absorbing element.

17. Covering element as claimed in claim 16, wherein the thermo stable element and the sound-absorbing element are integrated.

18. Covering element as claimed in claim 1, wherein a part of the covering element is provided with a heat-resistant element.

19. Covering element as claimed in claim 1, wherein the covering element is substantially flat.

20. Covering element as claimed in claim 1, wherein the fiber-reinforced thermoplastic plastic material of the carrier element comprises a glass mat-reinforced thermoplastic (GMT) or a long fiber-reinforced thermoplastic (LFT).

21. Method for manufacturing a covering element comprising:
   i) arranging in a mould a carrier element of fiber-reinforced thermoplastic plastic material at increased temperature, a sound-absorbing element and an adhesive layer, such that the adhesive layer extends over at least a part of the surface of the sound-absorbing element;
   ii) bringing the carrier element, the sound-absorbing element and the adhesive layer into the desired shape in the mould at increased pressure for the purpose of forming a covering element, wherein the fiber-reinforced thermoplastic plastic material of the covering element is in a viscous phase such that the plastic material spreads over the sound-absorbing element and over a part of the adhesive layer;
   iii) cooling the covering element in the mould such that the fiber-reinforced thermoplastic plastic material forms a solid carrier element which is adhered to a part of the adhesive layer, and wherein the sound-absorbing element is at least partly enclosed between the carrier element and the adhesive layer, wherein the adhesive layer is separable from the carrier element to allow removal of the sound absorbing element from between the carrier element and the adhesive layer.

22. Method as claimed in claim 21, wherein step i) comprises of heating the carrier element to a temperature of at least 175 to 275 degrees Celsius; preferably between 200 and 220 degrees Celsius, and arranging the heated carrier element in the mould.

23. Method as claimed in claim 21, wherein the adhesive layer extends over substantially the whole surface of the sound-absorbing element in step i) such that the sound-absorbing element is enclosed substantially in its entirety between the carrier element and the adhesive layer when step ii) is performed.

24. Method as claimed in claim 21, wherein the adhesive layer is a foil or fleece.

25. Method as claimed in claim 21, wherein a second adhesive layer is arranged between the sound-absorbing element and the carrier element.

26. Method as claimed in claim 21, wherein the thermoplastic plastic material comprises a polyolefin.

27. Method as claimed in claim 21, wherein the fiber-reinforced thermoplastic plastic material is introduced in viscous state into the mould.

28. Method as claimed in claim 21, wherein the adhesive layer is first placed in the mould, and then the sound-absorbing element and the thermoplastic plastic material.

29. Method as claimed in claim 21, wherein the thermoplastic plastic material is first introduced into the mould, and then the sound-absorbing element and the adhesive layer.

30. Method as claimed in claim 21, wherein the sound-absorbing element and the adhesive layer are combined outside the mould, and placed as total package into the mould.

31. Method as claimed in claim 21, wherein the fiber-reinforced thermoplastic material of the carrier element has a fiber percentage in the range of 5 to 80%.

32. Method as claimed in claim 21, wherein the fibers of the carrier element comprise glass fibers and/or basalt fibers and/or natural fibers.

33. Method as claimed in claim 21, wherein the natural fibers comprise hemp fibers, banana fibers, coconut fibers and/or flax fibers.

34. Method as claimed in claim 21, wherein the sound-absorbing element comprises an open-cell structure.

35. Method as claimed in claim 34, wherein the open-cell structure comprises a foam material, preferably polyurethane.

36. Method as claimed in claim 21, wherein the sound-absorbing element comprises felt-like material, glass wool or rock wool.

37. Method as claimed in claim 21, wherein the adhesive layer comprises the same thermoplastic material as the carrier element.

38. Method as claimed in claim 21, wherein the adhesive layer is impregnated with an oil-repellent and/or fuel-repellent agent.

39. Method as claimed in claim 21, wherein a thermostable element is arranged between the carrier element and the sound-absorbing element and/or between the adhesive layer and the sound-absorbing element.

40. Method as claimed in claim 39, wherein the thermostable element and the sound-absorbing element are integrated.

41. Method as claimed in claim 21, wherein a part of the covering element is provided with a heat-resistant element, preferably an aluminium element.

42. Method as claimed in claim 21, wherein the fiber-reinforced plastic material is a glass mat-reinforced thermoplastic (GMT) or a long fiber-reinforced thermoplastic (LFT).

43. Method as claimed in claim 21, wherein the sound-absorbing element is provided with openings such that the adhesive layer is adhered to the carrier element via these openings.

44. Method as claimed in claim 21, wherein the sound-absorbing element is arranged in a plurality of separate parts on the carrier part.

45. Method as claimed in claim 44, wherein the sound-absorbing element comprises a plurality of separate parts with differing sound-absorbing properties.

46. Covering element obtainable in accordance with the method of claim 21.

47. Vehicle covering element comprising a covering element as claimed in claim 1.

48. Use of a covering element as claimed in claim 1 for covering a vehicle, preferably a car or aircraft.

49. Covering element as claimed in claim 1, wherein the thermoplastic plastic material is a polypropylene, polyamide or polyethylene.

50. Method as claimed in claim 21, wherein the thermoplastic plastic material comprises a polypropylene, polyamide or polyethylene.

51. Covering element as claimed in claim 1, wherein the adhesive layer is removable from the carrier element.

52. Covering element as claimed in claim 1, wherein the adhesive layer is openable to allow removal of the sound-absorbing element from between the carrier element and the adhesive layer without removing the adhesive layer.

53. Method as claimed in claim 21, wherein the adhesive layer is removable from the carrier element.

54. Method as claimed in claim 21, wherein the adhesive layer is openable to allow removal of the sound-absorbing element from between the carrier element and the adhesive layer without removing the adhesive layer.

* * * * *